United States Patent
Kamio et al.

(10) Patent No.: US 7,245,225 B2
(45) Date of Patent: *Jul. 17, 2007

(54) FAILURE MONITOR FOR MOTOR DRIVE CONTROL SYSTEM

(75) Inventors: Shigeru Kamio, Nagoya (JP); Yasuhiro Nakai, Kariya (JP)

(73) Assignee: DENSO Corporation, Kariya (JP)

(*) Notice: Subject to any disclaimer, the term of this patent is extended or adjusted under 35 U.S.C. 154(b) by 196 days.

This patent is subject to a terminal disclaimer.

(21) Appl. No.: 11/017,664

(22) Filed: Dec. 22, 2004

(65) Prior Publication Data

US 2005/0146302 A1    Jul. 7, 2005

(30) Foreign Application Priority Data

Dec. 22, 2003  (JP) .............................. 2003-425651

(51) Int. Cl.
*G01B 31/02* (2006.01)

(52) U.S. Cl. .................... 340/648; 340/570; 340/571; 318/445; 318/823; 701/41

(58) Field of Classification Search ................ 340/648, 340/686.1, 670, 671, 686.3; 318/3, 445, 318/823; 701/1, 41

See application file for complete search history.

(56) References Cited

U.S. PATENT DOCUMENTS 5,869,776 A * 2/1999 Vuong et al. .............. 73/866.3
5,896,283 A * 4/1999 Usami ........................ 363/98
7,033,303 B2 * 4/2006 Takasaki et al. ............. 477/97

FOREIGN PATENT DOCUMENTS

JP    2002-323127    11/2002

* cited by examiner

*Primary Examiner*—Davetta W. Goins
(74) *Attorney, Agent, or Firm*—Nixon & Vanderhye P.C.

(57) ABSTRACT

A failure monitor designed to monitor a failure in operation of a motor drive control system. The system works to drive a motor-driven member through an output shaft and includes an angular position sensor for determining an angular position of the output shaft for use in controlling the motor. The failure monitor includes a storage device retaining an output shaft stop position that is the angular position of the output shaft, as determined upon a stop of the motor. The failure monitor detect the presence of failure of the angular position sensor based on a comparison between the angular position of the output shaft, as measured upon initiation of a motor start request, with the output shaft stop position.

12 Claims, 6 Drawing Sheets

FAILURE MONITOR FOR MOTOR DRIVE CONTROL SYSTEM

CROSS REFERENCE TO RELATED DOCUMENT

The present application claims the benefit of Japanese Patent Application No. 2003-425651 filed on Dec. 22, 2003, the disclosure of which is incorporated herein by reference.

BACKGROUND OF THE INVENTION

1. Technical Field of the Invention

The present invention relates generally to a failure monitor for a motor drive control system which controls rotation of a motor working to output torque to a motor-driven member through a torque transmitting mechanism and an output shaft joined to the motor-driven member.

2. Background Art

In recent years, in order to meet space saving requirements, facilitating ease of assembly, or improving controllability of automotive vehicles, there have been increased trends toward use of an electrical system working to drive a controlled mechanism through an electric motor. For example, Japanese Patent First Publication No. 2002-323127 discloses an automatic transmission control system designed to actuate a range shift mechanism for automotive automatic transmissions using an electric motor. A selection of gear ranges of the automatic transmission is achieved by actuating the range shift mechanism using a drive shaft joined to an output shaft of the motor through a speed reducing mechanism. The motor has installed thereon an angular position sensor such as an encoder working to measure an angular position of the output shaft of the motor. The system uses an output of the angular position sensor to rotate the motor to bring the angular position thereof into agreement with a target one, thereby establishing a selected one of the gear ranges of the automatic transmission through the range shift mechanism.

The rotation of the motor is converted into that of the drive shaft (i.e., a manipulated variable of the range shift mechanism) through the speed reducing mechanism. A speed reducing mechanism of this type is typically made of a gear train in which there is inevitably some play or looseness between gears. In a case where the speed reducing mechanism is joined to the drive shaft through fitting of a D-shaped connector formed on the tip of an axis thereof into a mating recess formed in the drive shaft, some clearance is required to facilitate ease of such fitting, which will, however, result in an error in the amount by which the output shaft is rotated by the motor even if the motor is controlled accurately by monitoring the output of the angular position sensor as representing the angular position of the motor, thus leading to a difficulty in controlling the manipulated variable of the range shift mechanism correctly.

In order to compensate for the error in the amount by which the output shaft is rotated, an output shaft angular position sensor may also be used to measure the angular position of the output shaft for controlling the motor to bring the angular position of the output shaft into agreement with a target one under feedback control.

However, if an error in the output of the output shaft angular position sensor arises from some failure in operation thereof, it will result in an error in controlling the manipulated variable of the range shift mechanism. This may cause the automatic transmission to be shifted to an erroneous one of the gear ranges through the range shift mechanism and result in a difficulty in monitoring a malfunction of the feedback control system.

SUMMARY OF THE INVENTION

It is therefore a principal object of the invention to avoid the disadvantages of the prior art.

It is another object of the invention to provide a failure monitor for a motor drive control system which controls rotation of a motor working to output torque to a motor-driven member through a torque transmitting mechanism and an output shaft joined to the motor-driven member.

According to one aspect of the invention, there is provided a motor drive control system failure monitoring apparatus designed to monitor a failure in operation of a motor drive control system. The motor drive control system works to control rotation of a motor working to output torque to a motor-driven member through a torque transmitting mechanism and an output shaft joined to the motor-driven member and an output shaft angular position sensor working to determine an angular position of the output shaft for use in controlling the rotation of the motor. The failure monitoring apparatus comprises: (a) a storage device which has stored therein an output shaft stop position that is the angular position of the output shaft, as determined upon turning off of the motor drive control system after a stop of the motor; and (b) a failure determining circuit which compares the angular position of the output shaft, as measured before a start of the motor after turning on of the motor drive control system, with the output shaft stop position stored in the storage device to determine whether the output shaft angular position sensor is failing or not.

When the motor is in an off-state, the output shaft must stop rotating. Thus, when an initial value of the angular position of the output shaft upon the start of the motor is different from the output shaft stop position stored in the storage device or such a difference lies within a permissible range, it may be determined that the output shaft angular position sensor is failing.

In the preferred mode of the invention, the motor drive control system may also include a motor angular position sensor working to determine an angular position of the motor for use in controlling rotation of the motor.

The motor-driven member is a range shift mechanism working to shift one of gear ranges of an automotive automatic transmission to a selected one.

According to the second aspect of the invention, there is provided a motor drive control system failure monitoring apparatus designed to monitor a failure in operation of a motor drive control system. The motor drive control system works to control rotation of a motor working to output torque to a motor-driven member through a torque transmitting mechanism and an output shaft joined to the motor-driven member and an output shaft angular position sensor working to determine an angular position of the output shaft for use in controlling the rotation of the motor. The failure monitoring apparatus comprising: (a) a storage device which has stored therein an output shaft stop position that is the angular position of the output shaft, as measured each time the motor is stopped during an on-state of the motor drive control system; and (b) a failure determining circuit which compares the angular position of the output shaft, as measured upon initiation of a start request to start the motor after, with the output shaft stop position stored in the storage device to determine whether the output shaft angular position sensor is failing or not. Specifically, the failure determining circuit works to determine whether the output shaft angular position sensor is failing or not each time it is required to start the motor during the on-state of the monitor drive control system, thus resulting in an increased number of times failure diagnosis is made to ensure the reliability in operation of the system.

In the preferred mode of the invention, when the angular position, as measured upon the initiation of the start request is different from the output shaft stop position, as stored in the storage device, the failure determining circuit determines that the output shaft angular position sensor has failed.

The motor drive control system includes a motor angular position sensor working to determine an angular position of the motor for use in controlling rotation of the motor.

The motor-driven member is a range shift mechanism working to shift one of gear ranges of an automotive automatic transmission to a selected one.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
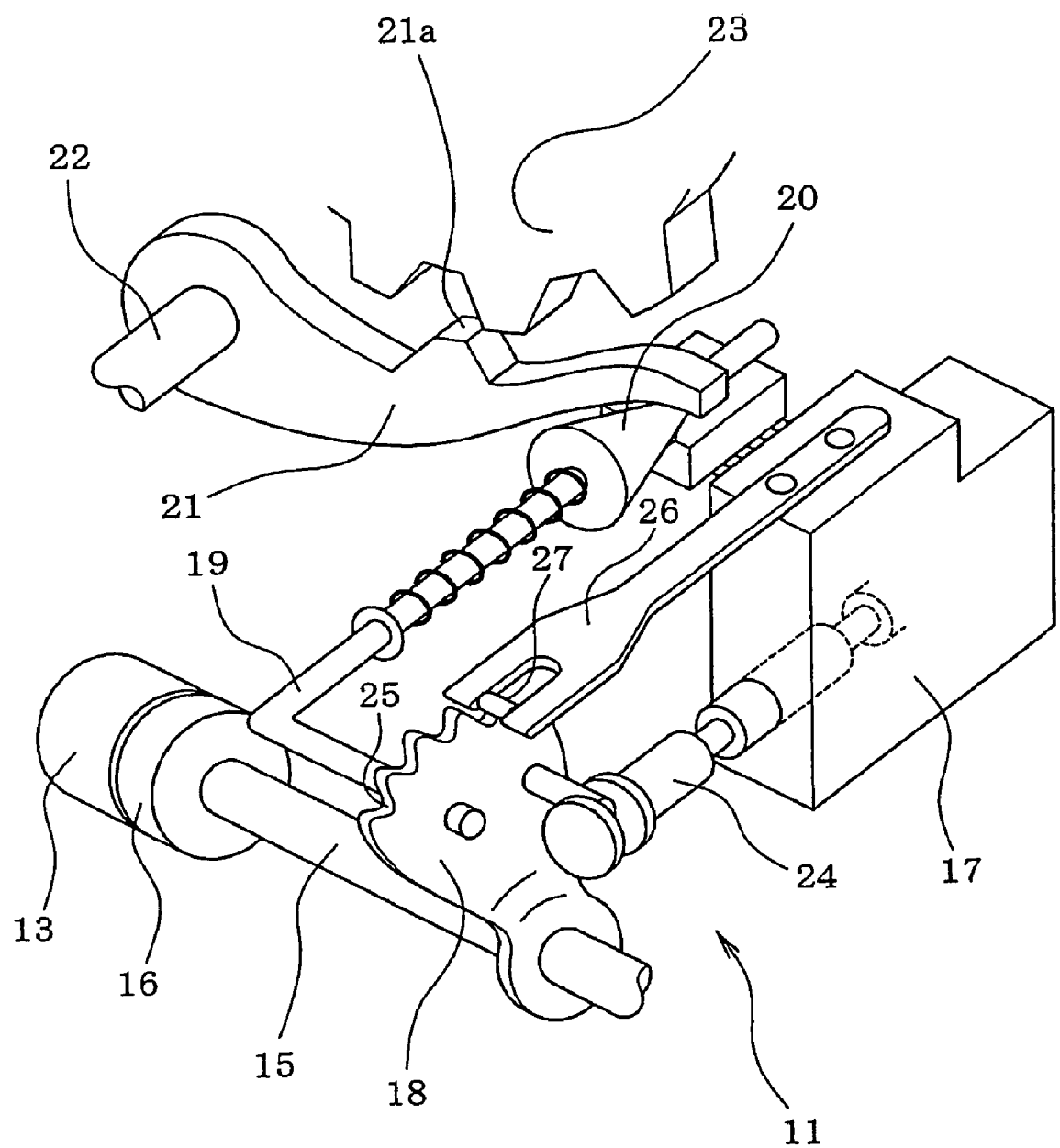
FIG. 1 is a perspective view which shows a motor drive control system failure monitoring system according to the first embodiment of the invention.
Figure 2:
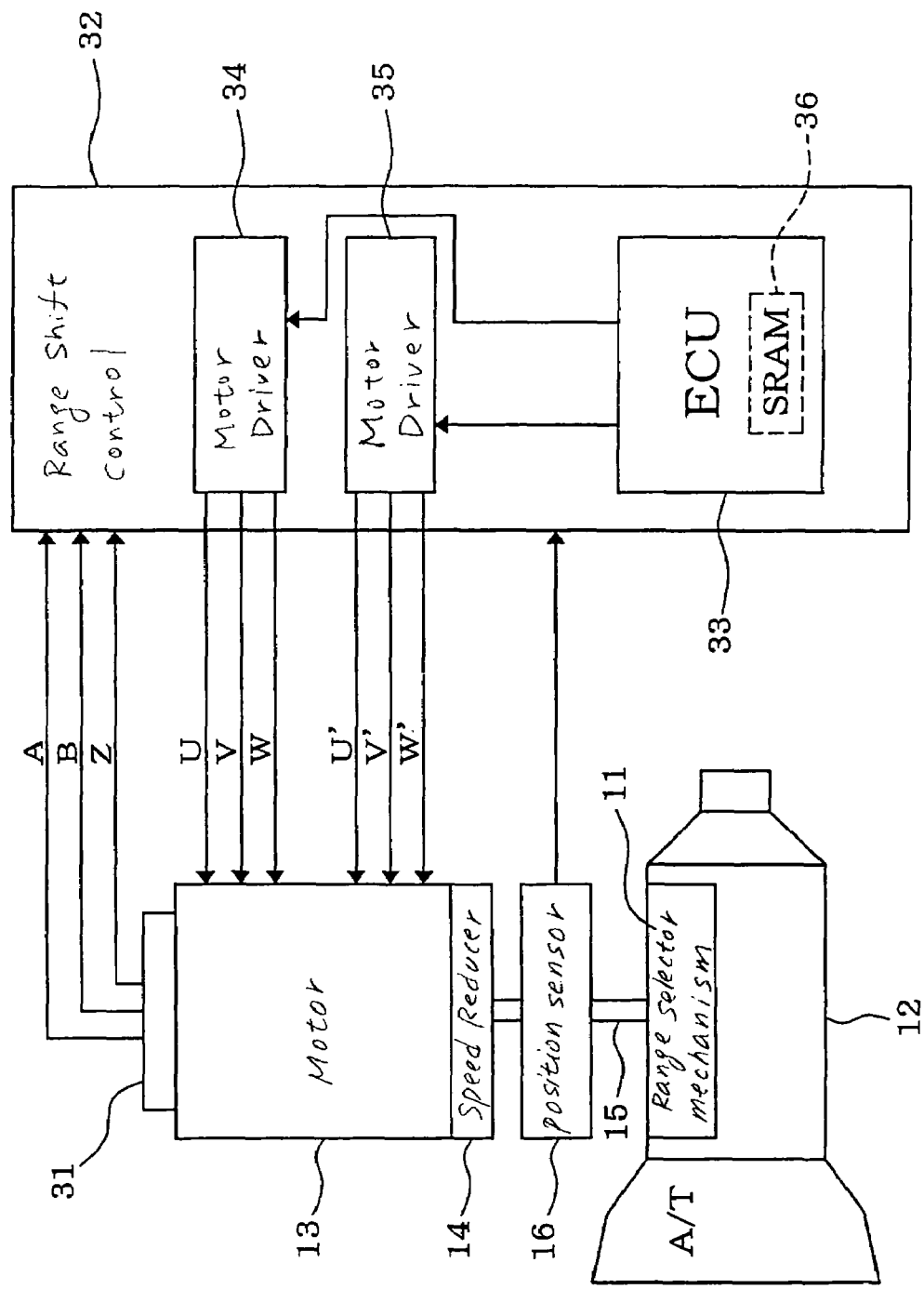
FIG. 2 is a block diagram which shows a circuit structure of the motor drive control system failure, as illustrated in FIG. 1.
Figure 3:
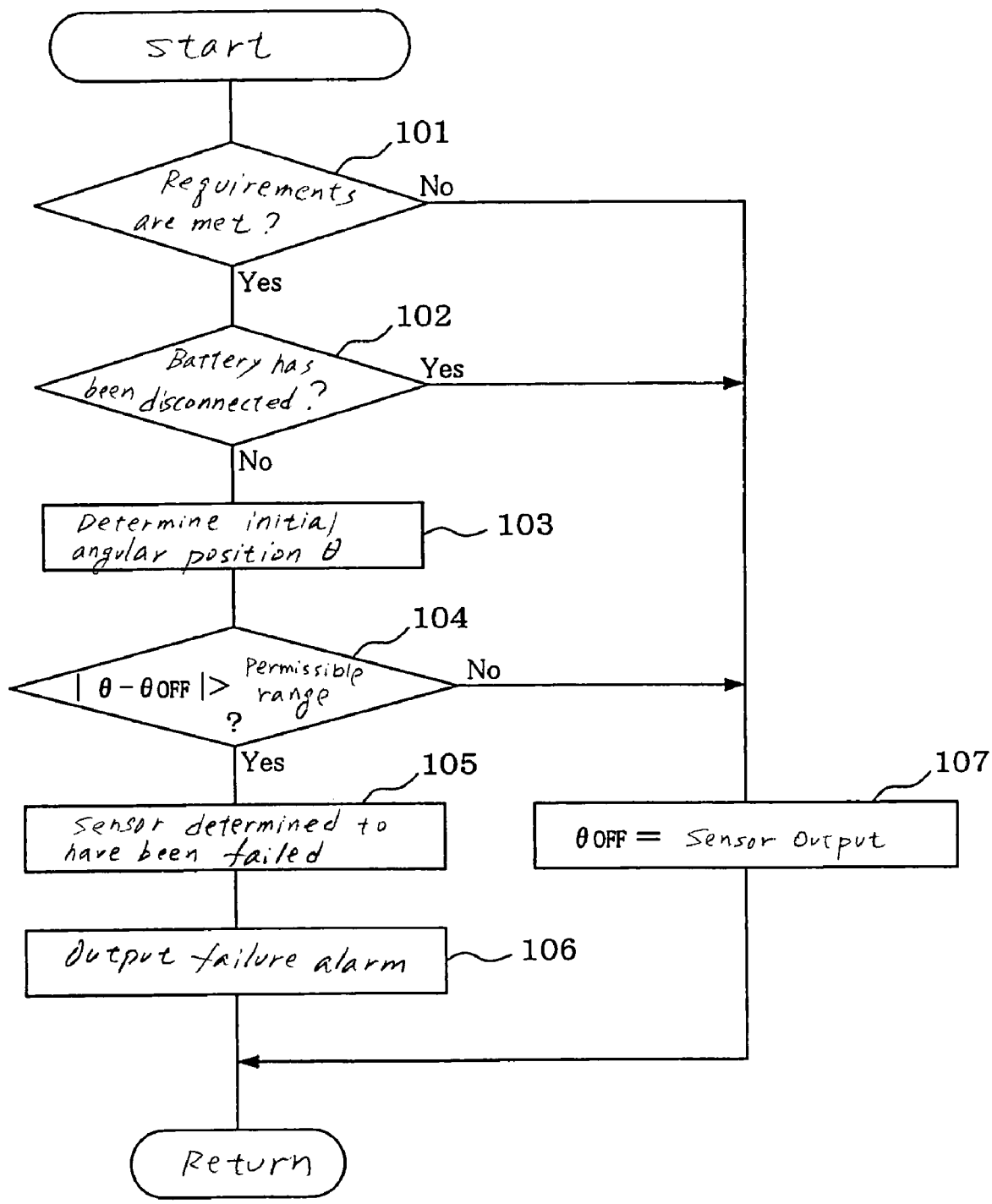
FIG. 3 is a flowchart of a program executed by an electronic control unit (ECU) of the motor drive control system failure monitoring system of FIG. 2.

Referring to the drawings, wherein like reference numbers refer to like parts in several views, particularly to FIGS. 1, 2, and 3, there is shown a motor drive control system failure monitoring apparatus according to the first embodiment of the invention which is used, as an example, to monitor a failure in operation of a motor driver for a range shift mechanism 11 working to change the gear of an automatic transmission 12 for automotive vehicles.

The automatic transmission 12, as referred to therein, has a typical structure which is designed to be switchable in operation between four gear ranges: a parking (P) range, a reverse (R) range, a neutral (N) range, and a drive (D) range. The range shift mechanism 11 works to shift the P, R, N, and D ranges of the automatic transmission 12 from one to another. The range shift mechanism 11 is driven by an electric motor 13. The motor 13 is made of a synchronous motor such as a switched reluctance motor (SRM) and has a speed reducing mechanism 14 installed therein, as shown in FIG. 2. The speed reducing mechanism 14 has an output shaft joined to the range shift mechanism 11 through an output shaft 15. The motor 13 also includes an output shaft sensor 16 which measures an angular position thereof and outputs a signal indicative thereof.

The output shaft 15, as clearly shown in FIG. 1, has secured thereon a detent lever 18 which works to change a valve position of a manual valve 17 disposed in a hydraulic circuit of the automatic transmission 12. The detect lever 18 has jointed thereto an L-shaped parking rod 19 which has a conical head 20 in abutment with a lock lever 21. The lock lever 21 is shifted vertically, as viewed in the drawing, around a support shaft 22 as the conical head 20 is moved by a shifting motion of the parking rod 19, thereby locking or unlocking a parking gear 23. The parking gear 23 is joined to an output shaft of the automatic transmission 12. When the parking gear 23 is locked from rotating by the lock lever 21, it will cause driven wheels of the automotive vehicle to be placed in parking mode.

The detent lever 18 has jointed thereto a spool valve 24 of the manual valve 17 through a pin. When the detent lever 18 is rotated by the motor 13 through the output shaft 15, it shifts the position of the spool valve 24 of the manual valve 17, thereby changing one of the P, R, N, and D ranges to another. The detent lever 18 has a waved end wall in which four recesses 25 are formed. The recesses 25 serve to hold the spool valve 24 at any one of four positions corresponding to the P, R, N, and D ranges of the automatic transmission 12, respectively.

A detent spring 26 is firmly fixed on the manual valve 17. The detent spring 26 has affixed to the tip thereof a pin 27 which engages a selected one of the recesses 25 of the detent lever 18 to hold the detent lever 18 at a corresponding one of four angular positions thereof, thereby holding the spool valve 24 of the manual valve 17 at the position corresponding to a selected or target one of the P, R, N, and D ranges of the automatic transmission 12.

When it is required to establish the P range, the parking rod 19 is moved to the lock lever 21 and then lifts it up at a large-diameter portion of the conical head 20 to bring a protrusion 21a of the lock lever 21 into engagement with one of gear teeth of the parking gear 23 so that the parking gear 23 is locked. This causes the output shaft (i.e., a driving shaft) of the automatic transmission 12 to be locked and placed in the parking mode.

Alternatively, when it is required to establish the gear range other than P range, the parking rod 19 is moved away from the lock lever 21 to bring the large-diameter portion of the conical head 20 into disengagement from the protrusion 21a of the lock lever 21, so that the protrusion 21a leaves one of gear teeth of the parking gear 23. This causes the output shaft of the automatic transmission 12 to be unlocked and allowed to rotate to ensure the running of the vehicle.

The output shaft sensor 16 is implemented by an angular position sensor such as a potensionmeter which works to produce an output voltage as a function of an angular position of the output shaft 15 of the speed reducing mechanism 14 of the motor 13. The output voltage is used to determine to which of the P, R, N, and D ranges the automatic transmission 12 is to be shifted.

The motor 13 has also installed thereon an encoder 31 working as an angular position sensor to measure an angular position of a rotor of the motor 13. The encoder 31 is implemented by, for example, a magnetic rotary encoder which is designed to output one of A-, B-, and Z-phase pulse signals in synchronization with rotation of the rotor of the motor 13 to a range selection control unit 32. The range selection control unit 32 includes motor drivers 34 and 35, and an electronic control unit (ECU) 33. The ECU 33, as will be described later in detail, serves as a system failure monitor. The ECU 33 counts both a leading and a trailing edge (also called a rising and a falling edge) of each of the A- and B-phase signals and uses such a count value (will also be referred to as an encoder count value below) to change one of phases of the motor 13 in a scheduled sequence to energize the motor 13 through the motor drivers 34 and 35, thereby achieving rotation of the motor 13.

The ECU 33 samples an input sequence of the A- and B-phase signals to determine a rotational direction of the rotor of the motor 13 and increments the encoder count value when the motor 13 is rotating in a normal direction in which the gear range of the automatic transmission 12 is shifted from the P to D range or decrements the encoder count value when the motor 13 is rotating in a reverse direction in which the gear range of the automatic transmission 12 is shifted from the D to P range. This establishes a matching between the encoder count value and the angular position of the motor 13 regardless of the rotational direction of the motor 13. The ECU 33 also samples the encoder count value to determine the angular position of the motor 13 and energizes a winding of one of the phases of the motor 13 corresponding to the determined angular position to activate the motor 13. Note that the Z-phase signal outputted by the encoder 31 is used in the ECU 33 to detect a reference angular position of the rotor of the motor 13.

When a vehicle operator has shifted a gear shift lever to one of a parking (F), a reverse (R), a neutral (N), and a drive (D) position which correspond to the P, R, N, and D ranges of the automatic transmission 12, respectively, the ECU 33 determines a target angular position of the motor 13 (i.e., a target value of the encoder count value) and starts to electrically energize or rotate the motor 13 under feedback control until the encoder count value reaches the target one. Additionally, the ECU 33 samples the output voltage of the output shaft sensor 16 to monitor an instantaneous angular position of the output shaft 15 (i.e., the amount by which the spool valve 24 of the manual valve 17 has been moved) and also determine in or to which of the P, R, N, and D ranges the automatic transmission 12 is placed currently or being shifted, thereby deciding whether a transmission gear change between the P, R, N, and D ranges has been completed correctly or not. The ECU 33 may also work to correct the target angular position of the motor 13 using the output voltage of the output shaft sensor 16 so as to compensate for a difference or error in angular position between the motor 13 and the output shaft 16 which usually arises from an inevitable play of the gear train.

If the system has failed, resulting in an error in the voltage output of the output shaft sensor 16, it will cause the ECU 30 to determine in error the angular position of the output shaft 15 (i.e., the amount by which the spool valve 24 of the manual valve 17 has been moved), so that the gear range of the automatic transmission 12 is selected incorrectly. This may cause the automatic transmission 12 to be shifted in error to an unselected one of the P, R, N, and D ranges or result in a difficulty in changing the gear of the automatic transmission 12 or detecting the failure in operation of the feedback control for the motor 13.

In order to avoid the above problems, the ECU 33 performs a sensor failure monitoring program, as shown in FIG. 3 to determine whether the output shaft sensor 16 is failing or not.

When the ECU 22 is turned on following turning on of an ignition switch (not shown) of the automotive vehicle, the ECU 33 starts to sample the output voltage of the output shaft sensor 16 periodically in a program execution cycle to measure an instantaneous value of the angular position $\theta$ of the output shaft 16 and update an output shaft stop position $\theta_{OFF}$ (i.e., a reference position) stored within an SRAM 36 (i.e., a rewritable volatile storage) to the measured value of the angular position $\theta$. When the ECU 33 is turned off, the last updated value of the output shaft stop position $\theta_{OFF}$ is retained as it is in the SRAM 36.

When the ECU 33 is turned on again, and failure monitoring requirements, as will be described later in detail, are met, the ECU 33 samples the output voltage of the output shaft sensor 16 to measure an instantaneous value of the angular position $\theta$ of the output shaft 16 (which will also be referred to below as an initial angular position $\theta$) and compares it with the output shaft stop position $\theta_{OFF}$, as retained n the RAM 36 upon previous turning off of the ECU 33. If a difference between the output shaft stop position $\theta_{OFF}$ and the initial angular position $\theta$ of the output shaft 16 lies within a permissible error range, the ECU 33 determines that the output shaft sensor 16 is operating normally. Alternatively, if such a difference is out of the permissible error range, the ECU 33 determines that the output shaft sensor 16 is malfunctioning. Specifically, when the motor 13 is at rest, the output shaft 16 must be stopped. Therefore, if the initial angular position $\theta$, as measured after the ECU 33 is turned on, but before the motor 13 starts to rotate, is different from the output shaft stop position $\theta_{OFF}$, as stored in the SRAM 36 by more than the permissible error range, it may be determined that the output shaft sensor 16 is failing in operation thereof.

The above operation is implemented by executing the program of FIG. 3. The program is performed cyclically as long as the ECU 33 is in an on-state.

After entering the program, the routine proceeds to step 101 wherein it is determined whether the failure monitoring requirements are met or not. The failure monitoring requirements are: 1) that an interval between the turning on of the ECU 33 and start of the motor 13 (i.e., initiation of a motor start request) is now been entered, 2) that a sensor failure decision for the output shaft sensor 16, as will be described below, has not yet been made after the ECU 33 is turned on, and 3) that an output voltage of a storage battery mounted in the vehicle is higher than a lower limit of a permissible range, that is, that a source voltage for the output shaft sensor 16 is within an operative range. If any of the requirements 1), 2), and 3) is not satisfied, a NO answer is obtained in step 101. The routine then proceeds to step 107 wherein the ECU 33 samples the output voltage of the output shaft sensor 16 to determine the initial angular position $\theta$ of the output shaft 15 and stores it as the output shaft stop position $\theta_{OFF}$ in the SRAM 36. The routine then terminates. Alternatively, if a YES answer is obtained in step 101 meaning that the above three requirements are met, then the routine proceeds to step 102 wherein it is determined whether the battery serving as a backup power supply for the ECU 33 (i.e., the SRAM 36) has been disconnected from the ECU 33 once before the ECU 33 is turned on (i.e., during the off-state of the ignition switch) or not. This determination is made by determining whether data (e.g., the output shaft stop position $\theta_{OFF}$), as stored in the SRAM 36 has been cleared to an initial value of, for example, zero (0) or not. This is because if the battery is disconnected, the SRAM 36 which retains the output shaft stop position $\theta_{OFF}$ as it is during the off-state of the ECU 33 experiences a cut of operating power from the backup power supply so that the data stored therein will disappear. Instead of the SRAM 36, a rewritable nonvolatile storage not requiring the backup power supply such as an EEPROM may be used to eliminate the need for step 102.

If a YES answer is obtained in step 102 meaning the battery has undergone the removal of operating power, thus resulting in the disappearance of the data from the SRAM 36, then the routine proceeds to step 107 wherein the ECU 33 samples the output voltage of the output shaft sensor 16 to determine the initial angular position θ of the output shaft 15 and updates the output shaft stop position $\theta_{OFF}$ in the SRAM 36 to the determined initial angular position θ. The routine then terminates. Alternatively, if a NO answer is obtained in step 102, then the routine proceeds to step 103 wherein the ECU 33 samples the output voltage of the output shaft sensor 16 to determine it as the initial angular position θ of the output shaft 15. The routine proceeds to step 104 wherein the initial angular position θ, as derived in step 103, is compared with the output shaft stop position $\theta_{OFF}$ stored in the SRAM 36 to determine whether an absolute value of a difference between the initial angular position θ and the output shaft stop position $\theta_{OFF}$ is greater than a permissible error or not.

If a YES answer is obtained in step 104, then the routine proceeds to step 105 wherein the output shaft sensor 16 is malfunctioning. The routine proceeds to step 106 wherein a warning lamp (not shown) is turned on or blinked or warning information is indicated on a display installed on an instrument panel (not shown) to inform the vehicle operator of the failure of the output shaft sensor 16, and the fact that the output shaft sensor 16 is malfunctioning is stored in the SRAM 36. The routine then terminates.

If a NO answer is obtained in step 104 meaning that the absolute value of the difference between the initial angular position θ and the output shaft stop position $\theta_{OFF}$ is not greater than the permissible error, that is, that the output shaft sensor 16 is operating normally, then the routine proceeds to step 107 wherein the ECU 33 samples the output voltage of the output shaft sensor 16 to determine the initial angular position θ of the output shaft 15 and stores it as the output shaft stop position $\theta_{OFF}$ in the SRAM 36. The routine then terminates.

As apparent from the above discussion, the motor drive control system failure monitoring apparatus is designed to detect the failure in operation of the output shaft sensor 16 which has occurred during the off-state of the ECU 33. Upon detection of such a failure, the system may initiate a fail-safe function to ensure gear changes of the automatic transmission 12 to a desired one of the P, R, N, and D ranges, thereby allowing the operator to drive the vehicle to, for example, a motor vehicle workshop.

The failure monitoring program of FIG. 3 works to update the output shaft stop position $\theta_{OFF}$ stored in the SRAM 36 in a cycle during the on-state of the ECU 33 and retains the value of the output shaft stop position $\theta_{OFF}$, as updated last before the ECU 33 is turned off, within the SRAM 36. However, the program may be so modified as to sample the output voltage of the output shaft sensor 16 upon turning off of the ignition switch of the vehicle to determine and retain the output shaft stop position $\theta_{OFF}$ in the SRAM 36, and then turn off a power relay for the ECU 33.

Instead of the program of FIG. 3, another program may be used which samples the output voltage of the output shaft sensor 16 to determine and retain the output shaft stop position $\theta_{OFF}$ in a RAM of the ECU 33 (or the SRAM 36) each time the motor 13 is stopped from rotating during the on-state of the ECU 33 (i.e., the on-state of the ignition switch), and then compares the value of the angular position of the output shaft 15, as measured by the output shaft sensor 16 when a motor restart request is initiated to activate the motor 13 for changing the gear of the automatic transmission 12, with the output shaft stop position $\theta_{OFF}$, as stored in the RAM to determine whether the output shaft sensor 16 is failing or not. Specifically, the ECU 33 works to determine whether the output shaft sensor 16 is failing or not each time it is required to start the motor 13 during the on-state of the ECU 33, thus resulting in an increased number of times the failure diagnosis is made to ensure the reliability in operation of the system. Such a failure diagnosis operation may be performed additionally in the program of FIG. 3.

The values of the angular position θ of the output shaft 15 and the output shaft stop position $\theta_{OFF}$ may be derived by converting an A/D converted value of the output voltage of the output shaft sensor 16 to a parameter representing an angular position of the output shaft 15. Such an A/D converted value may alternatively be employed as it is as the angular position θ and the output shaft stop position $\theta_{OFF}$.

The output shaft sensor 16 is of a type such as a potensiometer which outputs the voltage signal varying in level linearly following rotation of the output shaft 15, but may be made up of a plurality of switches designed to produce patterns of on- and -off signals indicating angular positions of the output shaft 15 which match the P, R, N, and D positions of the gear shift lever (i.e., the P, R, N, and D ranges of the automatic transmission 12). An example of such a modification will be described below as the second embodiment with reference to FIGS. 4, 5, and 6. The second embodiment is identical in arrangements with the first embodiment except for as discussed below.

Figure 4:
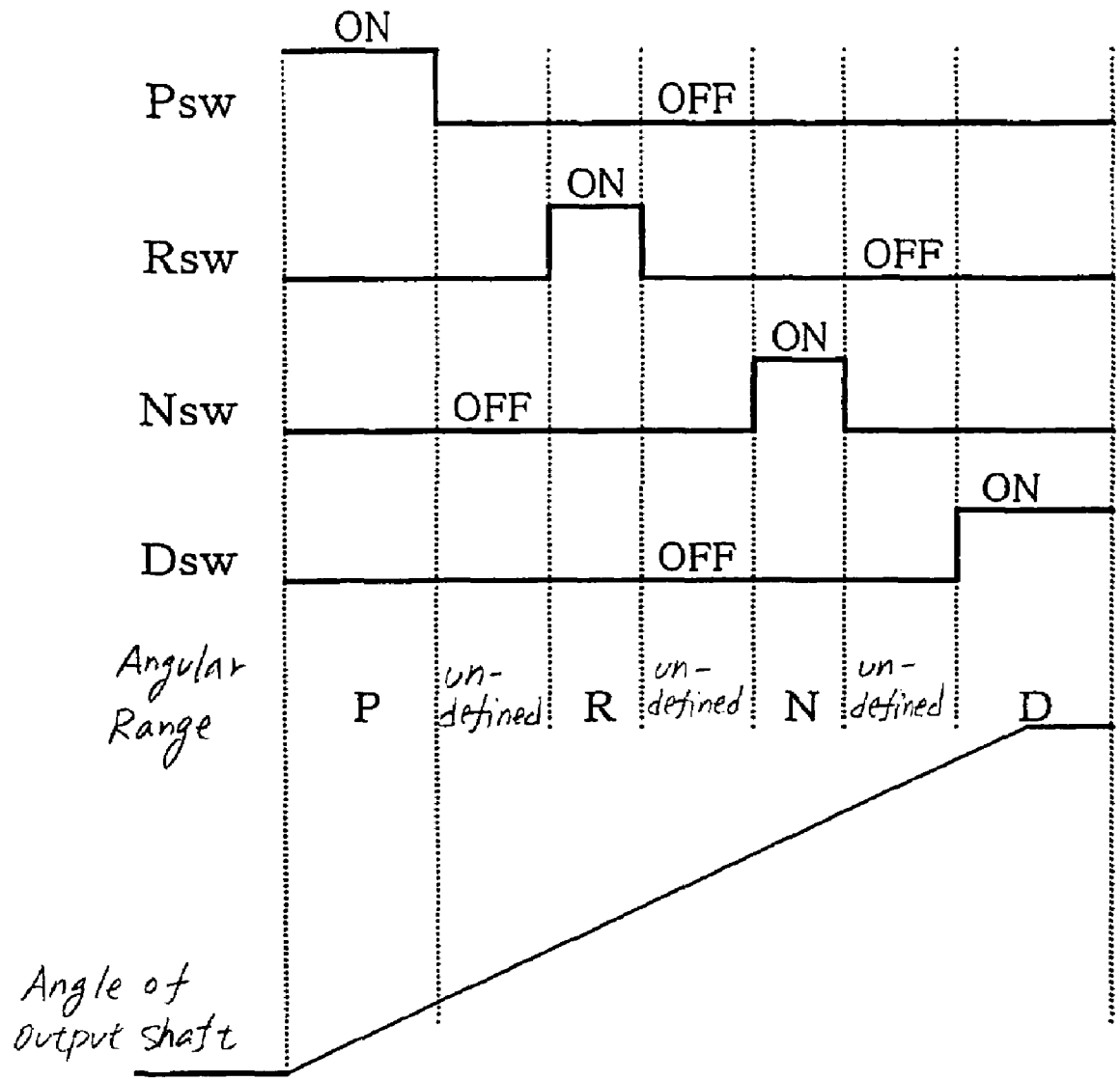
FIG. 4 is a view which shows relations between outputs of switches of an output shaft sensor and angular positions of the output shaft (i.e., gear ranges of automatic transmission) according to the second embodiment of the invention.
Figure 5:
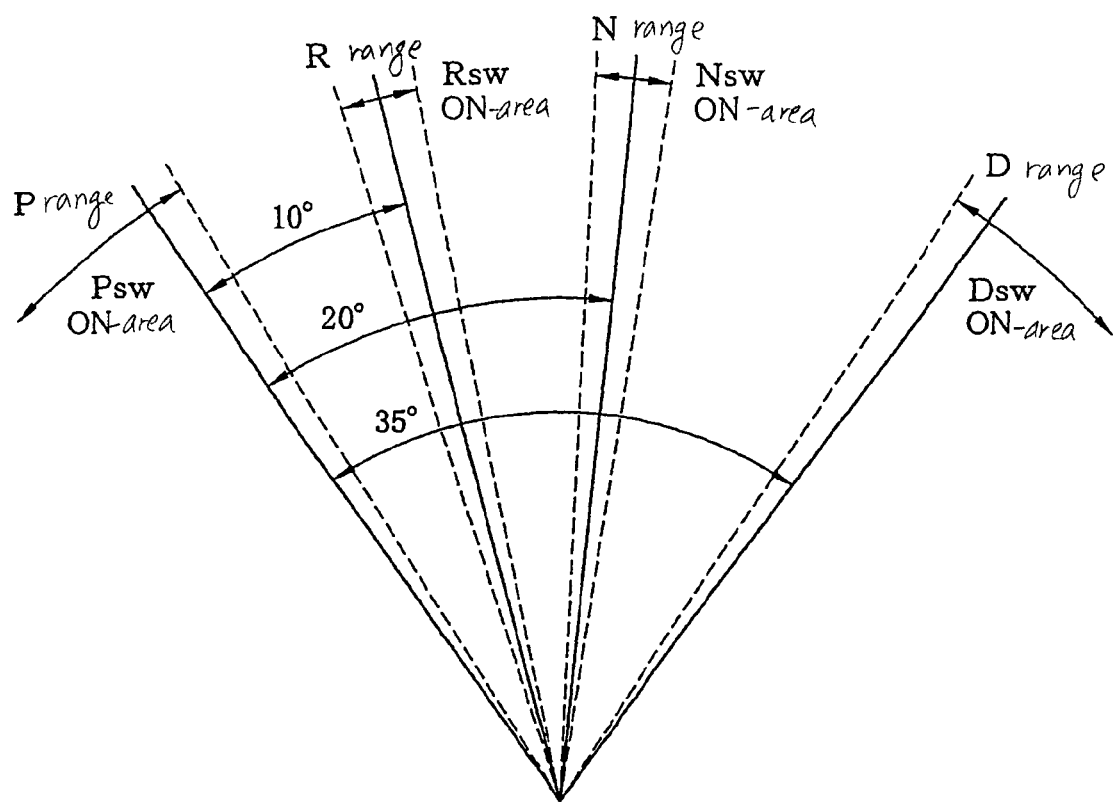
FIG. 5 is a schematic view which shows a structure of an output shaft sensor according to the second embodiment of the invention.

The output shaft sensor 16, as used in the second embodiment, consists, as shown in FIGS. 4 and 5, of four switches Psw, Rsw, Nsw, and Dsw each of which is turned on to produce an on-signal when the output shaft 15 falls, as can be seen in FIG. 5, in a corresponding one of four angular ranges P, R, N, and D matching the P, R, N, and D ranges of the automatic transmission 12. Specifically, the switches Psw, Rsw, Nsw, and Dsw work to produce patterns of combinations of on/off binary signals, as can be seen from FIG. 4, different among the angular ranges P, R, N, and D, thereby indicating in which of the four angular ranges P, R, N, and D the output shaft 15 is placed.

Figure 6:
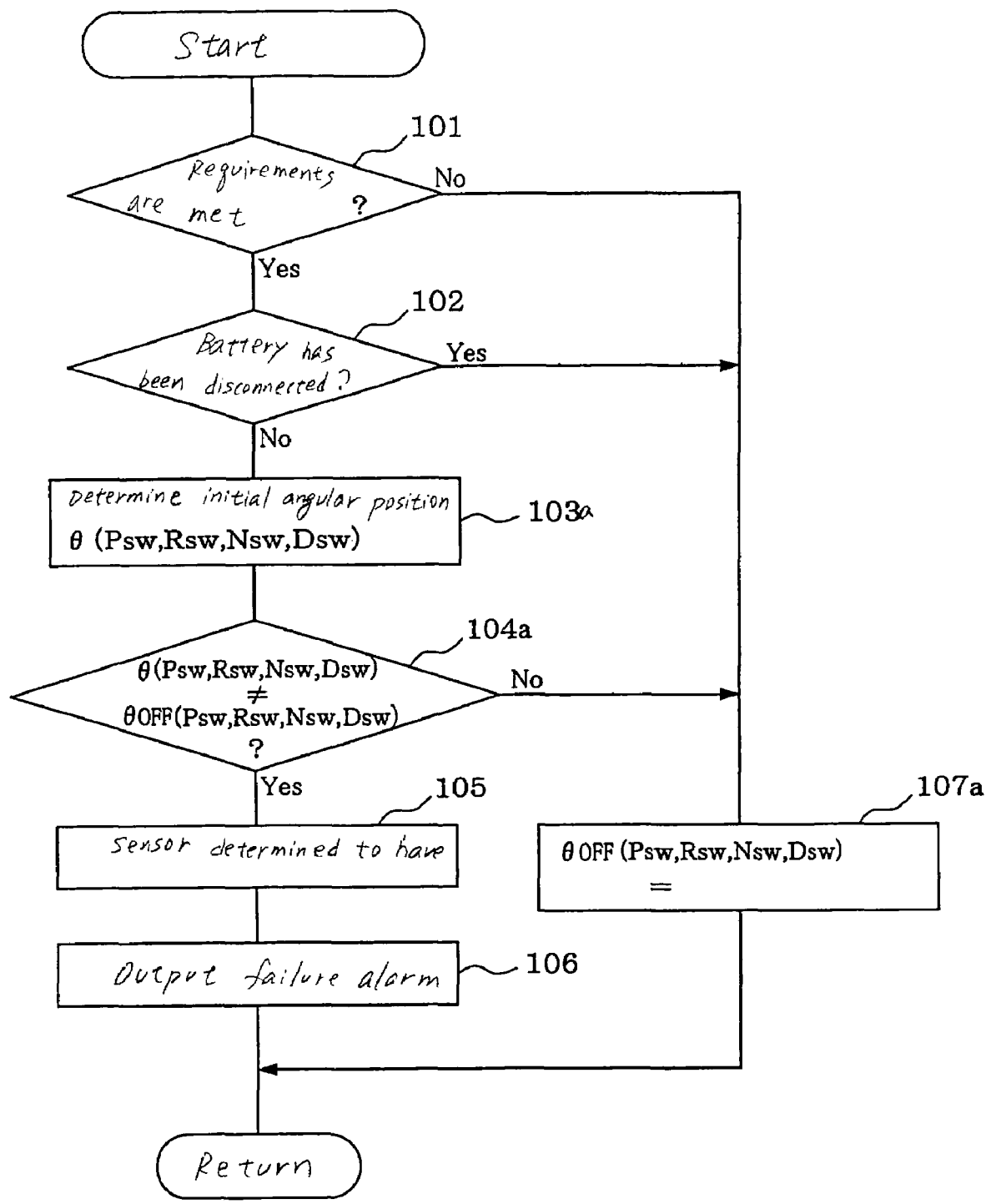
FIG. 6 is a flowchart of a program executed by an electronic control unit (ECU) of the motor drive control system failure monitoring system of FIG. 2 according to the second embodiment of the invention.

FIG. 6 shows a failure monitoring program, as executed in the ECU 33, which is different only in steps 103a, 104a, and 107a from the one in FIG. 3. Other steps are identical, and explanation thereof in detail will be omitted here.

The program is executed in a cycle during the on-state of the ignition switch of the vehicle (i.e., during the on-state of the ECU 33). After entering the program, the routine proceeds to step 101 whether the failure monitoring requirements are met or not. If a YES answer is obtained, then the routine proceeds to step 102 wherein it is determined whether the battery has been disconnected from the ECU 33 once before the ECU 33 is turned on or not. If a NO answer is obtained in step 101 or a YES answer is obtained in step 102, then the routine proceeds to step 107a wherein outputs (i.e., the on-off binary signals) of the switches Psw, Rsw, Nsw, and Dsw are sampled to determine the angular position θ (Psw, Rsw, Nsw, Dsw) of the output shaft 15 and updates the output shaft stop position $\theta_{OFF}$, as stored in the SRAM 36, to the determined angular position θ (Psw, Rsw, Nsw, Dsw) (which will be referred to below as an output shaft stop position $\theta_{OFF}$(PSW, Rsw, Nsw, Dsw)). The routine then terminates.

If a NO answer is obtained in step 102 meaning the battery does not undergo the removal of operating power, then the routine proceeds to step 103a wherein the ECU 33 samples the on/off binary signals outputted from the switches Psw, Rsw, Nsw, and Dsw to determine it as an initial angular position θ (Psw, Rsw, Nsw, Dsw) of the output shaft 15 (i.e., the angular position of the output shaft 15 after the motor 13 is stopped). The routine then proceeds to step 104a wherein the initial angular position θ (Psw, Rsw, Nsw, Dsw) is compared with the output shaft stop position $\theta_{OFF}$(Psw, Rsw, Nsw, Dsw), as stored in the SRAM 36, to determine whether they are unidentical each other or not. If a YES answer is obtained in step 104 meaning that the initial angular position θ (Psw, Rsw, Nsw, Dsw) and the output shaft stop position $\theta_{OFF}$(Psw, Rsw, Nsw, Dsw) are different from each other, then the routine proceeds to step 105 wherein the output shaft sensor 16 is malfunctioning. The routine proceeds to step 106 wherein a warning lamp (not shown) is turned on or blinked or warning information is indicated on a display of an instrument panel (not shown) to inform the vehicle operator of the failure of the output shaft sensor 16, and the fact that the output shaft sensor 16 is malfunctioning is stored in the SRAM 36. The routine then terminates.

If a NO answer is obtained in step 104 meaning that the output shaft sensor 16 is operating normally, then the routine proceeds to step 107a wherein the output shaft stop position $\theta_{OFF}$(Psw, Rsw, Nsw, Dsw), as stored in the SRAM 36, is updated to the latest value of the angular position θ (Psw, Rsw, Nsw, Dsw). The routine then terminates.

The range shift mechanism 11, as used in the first and second embodiments, works to change the gear of the automatic transmission 12 from one to another of the P, R, N, and D ranges in response to a gear change request outputted from the ECU 33, but however, the invention may be employed in a range shift mechanism which is capable of changing the gear of the automatic transmission 12 additionally to a second-speed range or a low range or designed to switch the gear of the automatic transmission 12 only between two ranges: a parking range and a non-parking range.

The invention may alternatively be used with a variety of devices driven by a synchronous motor such as an SR motor.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A motor drive control system failure monitoring apparatus designed to monitor a failure in operation of a motor drive control system which controls rotation of a motor working to output torque to a motor-driven member through a torque transmitting mechanism and an output shaft joined to the motor-driven member and includes an output shaft angular position sensor working to determine an angular position of the output shaft for use in controlling the rotation of the motor, comprising:

a storage device which has stored therein an output shaft stop position that is the angular position of the output shaft, as determined upon turning off of the motor drive control system after a stop of the motor; and a failure determining circuit which compares the angular position of the output shaft, as measured before a start of the motor after turning on of the motor drive control system, with the output shaft stop position stored in said storage device to determine whether the output shaft angular position sensor is failing or not.

2. A motor drive control system failure monitoring apparatus as set forth in claim 1, wherein when a difference between the output shaft stop position, as stored in the storage device, and the angular position, as measured before the start of the motor falls is out of a given permissible range, said failure determining circuit determines that the output shaft angular position sensor has failed.

3. A motor drive control system failure monitoring apparatus as set forth in claim 1, wherein the motor drive control system includes a motor angular position sensor working to determine an angular position of the motor for use in controlling rotation of the motor.

4. A motor drive control system failure monitoring apparatus as set forth in claim 1, wherein the motor-driven member is a range shift mechanism working to shift one of gear ranges of an automotive automatic transmission to a selected one.

5. A motor drive control system failure monitoring apparatus designed to monitor a failure in operation of a motor drive control system which controls rotation of a motor working to output torque to a motor-driven member through a torque transmitting mechanism and an output shaft joined to the motor-driven member and an output shaft angular position sensor working to determine an angular position of the output shaft for use in controlling the rotation of the motor, comprising:

a storage device which has stored therein an output shaft stop position that is the angular position of the output shaft, as measured each time the motor is stopped during an on-state of the motor drive control system; and a failure determining circuit which compares the angular position of the output shaft, as measured upon initiation of a start request to start the motor after, with the output shaft stop position stored in said storage device to determine whether the output shaft angular position sensor is failing or not.

6. A motor drive control system failure monitoring apparatus as set forth in claim 5 wherein when the angular position, as measured upon the initiation of the start request is different from the output shaft stop position, as stored in the storage device, said failure determining circuit determines that the output shaft angular position sensor has failed.

7. A motor drive control system failure monitoring apparatus as set forth in claim 5, wherein the motor drive control system includes a motor angular position sensor working to determine an angular position of the motor for use in controlling rotation of the motor.

8. A motor drive control system failure monitoring apparatus as set forth in claim 5, wherein the motor-driven member is a range shift mechanism working to shift one of gear ranges of an automotive automatic transmission to a selected one.

9. A method of monitoring a failure in operation of a motor drive control system which controls rotation of a motor working to output torque to a motor-driven member through a torque transmitting mechanism and an output shaft joined to the motor-driven member and includes an output shaft angular position sensor working to determine an angular position of the output shaft for use in controlling the rotation of the motor, the method comprising:

detecting an output shaft stop position that is the angular position of the output shaft, as determined upon turning off of the motor drive control system after a stop of the motor;

storing the output shaft stop position;

detecting the angular position of the output shaft, as measured before a start of the motor after turning on of the motor drive control system;

comparing the detected angular position of the output shaft with the stored output shaft stop position; and determining whether the output shaft angular position sensor is failing or not based on the comparison of the detected angular position of the output shaft with the stored output shaft stop position.

10. The method as in claim 9, wherein when a difference between the stored output shaft stop position and the detected angular position is out of a given permissible range, a determination is made that the output shaft angular position sensor has failed.

11. A method of monitoring a failure in operation of a motor drive control system which controls rotation of a motor working to output torque to a motor-driven member through a torque transmitting mechanism and an output shaft joined to the motor-driven member and an output shaft angular position sensor working to determine an angular position of the output shaft for use in controlling the rotation of the motor, the method comprising:

detecting an output shaft stop position that is the angular position of the output shaft, as measured each time the motor is stopped during an on-state of the motor drive control system;

storing the output shaft stop position;

detecting the angular position of the output shaft, as measured upon initiation of a start request to start the motor thereafter;

comparing the detected angular position with the stored output shaft stop position; and determining whether the output shaft angular position sensor is failing or not based on the comparison of the detected angular position with the stored output shaft stop position.

12. A method as in claim 11, wherein when the detected angular position, as measured upon the initiation of the start request, is different from the stored output shaft stop position, a determination is made that the output shaft angular position sensor has failed.

* * * * *